Dec. 8, 1925.
G. FORNACA
1,564,842
SUPERFEED SYSTEM FOR INTERNAL COMBUSTION ENGINES
Filed Dec. 18, 1924
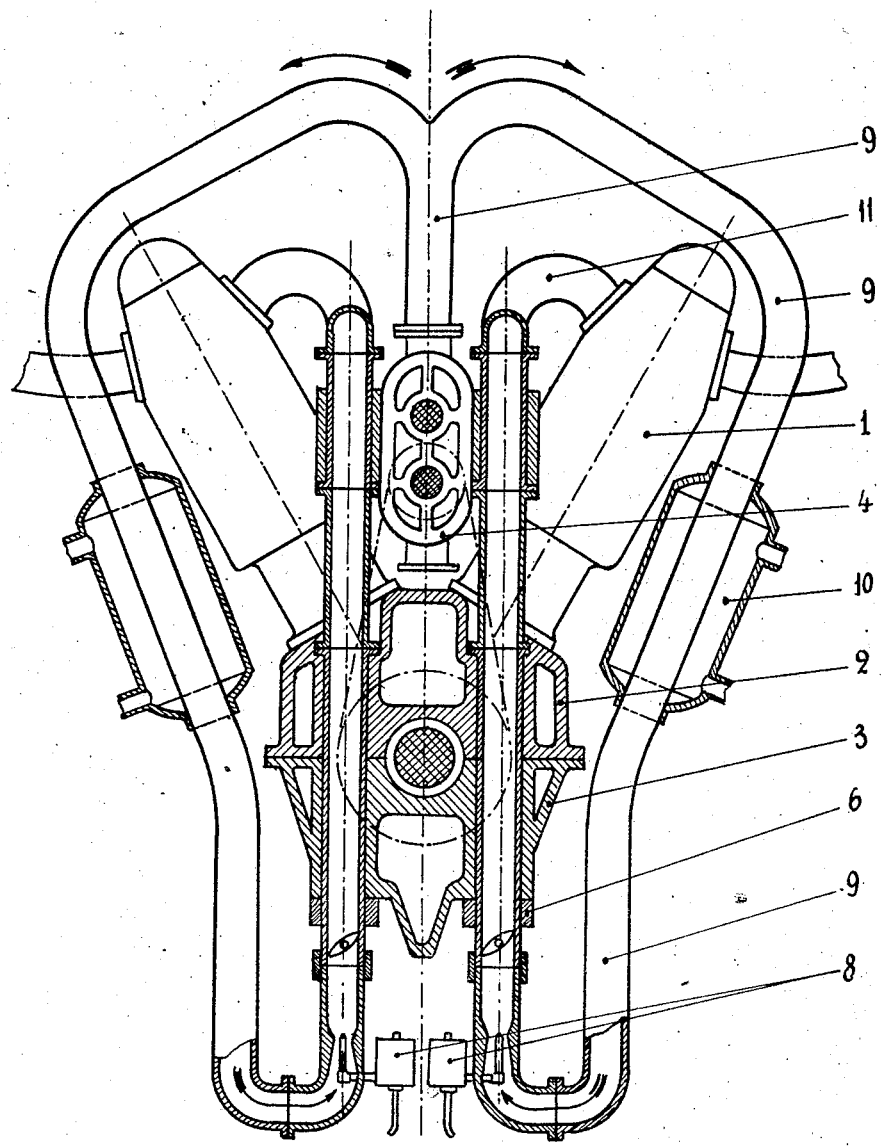

Patented Dec. 8, 1925.

1,564,842

UNITED STATES PATENT OFFICE.

GUIDO FORNACA, OF TURIN, ITALY.

SUPERFEED SYSTEM FOR INTERNAL-COMBUSTION ENGINES.

Application filed December 18, 1924. Serial No. 756,763.

*To all whom it may concern:*

Be it known that I, GUIDO FORNACA, a subject of the King of Italy, resident of 7 Via Giannone, Turin, in the Kingdom of Italy, and whose post-office address is 7 Via Giannone, Turin, Italy, have invented certain new and useful Improvements in Superfeed Systems for Internal-Combustion Engines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to superfeed systems for internal combustion engines of that type in which the inlet pipes pass through the engine casing to the engine cylinders.

In accordance with the present invention there is provided an improved arrangement having the characteristic feature that the portions of the inlet pipes which extend through the casing serve to connect and strengthen the parts of the latter and also to support the compressor for the system.

Preferably the aforesaid portions of the inlet pipes are provided with shoulders or flanges and screw nuts for connecting the parts of the engine casing; and the compressor casing is mounted on the upper portions of the pipes.

The fluid compressed by the compressor may be conveyed to the inlet pipes through branch pipes arranged to pass through water or oil coolers.

One form of the invention is illustrated by way of example diagrammatically on the accompanying drawing, to which reference will now be made.

1 indicates the engine cylinders disposed in two inclined series and fixed to a base 2 having a lower portion 3, the parts 2 and 3 together forming the engine casing.

A compressor 4 is arranged between the two series of cylinders being mounted on the inlet pipes 5 which, as shown, pass through the engine casing and serve to strengthen and fix the parts of the latter by means of nuts 6 in conjunction with shoulders or flanges 7 on the pipes.

In the lower parts of the inlet pipes are fixed carburetters 8 which receive air from the compressor 4 through pipes 9 of suitable length passing through water or oil coolers 10.

At the upper parts the pipes 5 communicate by ducts 11 with the engine cylinders 1.

The form and constructive details of the arrangement may, of course, vary from those above described without departing from the spirit or scope of the invention.

What I claim is:

1. An internal combustion engine of the V-type, comprising a crank-case formed of separate superposed parts, cylinders mounted on the crank-case, fuel supply-pipes constituting connecting means for said crank-case parts communicating with the cylinders and extending through the crank case, and means on the pipes for clamping the parts of the crank-case together.

2. An internal combustion engine of the V-type, comprising a crank-case formed of separate superposed parts, cylinders mounted on the crank-case, fuel supply-pipes constituting connecting means for said crank-case parts communicating with the cylinders and extending through the crank-case, means on the pipes for clamping the parts of the crank-case together, and a compressor mounted on said pipes between the cylinders.

3. An internal combustion engine of the V-type, comprising a crank-case formed of separate superposed parts, cylinders mounted on the crank-case, fuel supply pipes constituting connecting means for said crank-case parts communicating with the cylinders and extending through the crank-case, means on the pipes for clamping the parts of the crank case together, a compressor mounted on said pipes between the cylinders, carburetters communicating with the pipes, and conduits connecting the compressor with the fuel supply pipes.

In testimony that I claim the foregoing as my invention, I have signed my name.

GUIDO FORNACA.